United States Patent
Yokoyama et al.

(10) Patent No.: US 8,093,774 B2
(45) Date of Patent: Jan. 10, 2012

(54) DIRECT CURRENT MOTOR

(75) Inventors: Masayuki Yokoyama, Chiyoda-ku (JP);
Youichi Fujita, Chiyoda-ku (JP); Sotsuo Miyoshi, Chiyoda-ku (JP); Naohiro Oketani, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 210 days.

(21) Appl. No.: 12/514,756

(22) PCT Filed: Nov. 19, 2007

(86) PCT No.: PCT/JP2007/072393
§ 371 (c)(1),
(2), (4) Date: Jun. 12, 2009

(87) PCT Pub. No.: WO2008/069016
PCT Pub. Date: Jun. 12, 2008

(65) Prior Publication Data
US 2010/0026118 A1 Feb. 4, 2010

(30) Foreign Application Priority Data
Dec. 4, 2006 (JP) .................. 2006-326842

(51) Int. Cl.
*H02K 5/173* (2006.01)
*H02K 7/08* (2006.01)
(52) U.S. Cl. .......................................... 310/91; 310/90
(58) Field of Classification Search ............... 310/43, 310/67 R, 90, 91
See application file for complete search history.

(56) References Cited

U.S. PATENT DOCUMENTS

| | | | | |
|---|---|---|---|---|
| 4,629,919 A | * | 12/1986 | Merkle | 310/90 |
| 4,773,262 A | * | 9/1988 | Girard et al. | 73/147 |
| 4,954,736 A | * | 9/1990 | Kawamoto et al. | 310/156.21 |
| 5,683,183 A | * | 11/1997 | Tanaka et al. | 384/100 |
| 6,091,568 A | * | 7/2000 | Gilliland | 360/97.02 |
| 6,365,994 B1 | * | 4/2002 | Watanabe et al. | 310/49.01 |
| 6,378,839 B2 | * | 4/2002 | Watanabe et al. | 251/129.11 |
| 6,429,564 B1 | * | 8/2002 | Uemura et al. | 310/153 |

(Continued)

FOREIGN PATENT DOCUMENTS
EP 1 113 569 A1 7/2001
(Continued)

OTHER PUBLICATIONS

Interrogation, corresponding to JP 2008-525288, mailed Apr. 27, 2010.
(Continued)

*Primary Examiner* — Tran Nguyen
(74) *Attorney, Agent, or Firm* — Sughrue Mion, PLLC

(57) ABSTRACT

A direct current motor includes: a stator (2) on which a plurality of coils (4) is provided; a rotor (8) including a plurality of permanent magnet magnetic poles (9) that is provided so as to face an inner periphery of the stator, and a pipe (11) on one end; a current-carrying portion (19) that is provided on the other end of the rotor (8) and commutates current supplied from a power source to the coils (4) on the stator (2); a sleeve bearing (6) that holds the rotor (8); and a ball bearing (7) that holds the rotor (8) and has a larger load-bearing capacity than that of the sleeve bearing (6). Furthermore, the pipe (11) holds the ball bearing (7) and is in direct contact with the ball bearing (7).

10 Claims, 5 Drawing Sheets

U.S. PATENT DOCUMENTS

| | | | |
|---|---|---|---|
| 6,488,259 B1 * | 12/2002 | Fujita et al. | 251/129.11 |
| 7,608,969 B2 * | 10/2009 | Suzuki et al. | 310/216.009 |
| 2002/0036433 A1 * | 3/2002 | Mayumi et al. | 310/49 R |
| 2004/0189113 A1 * | 9/2004 | Kuribara | 310/67 R |
| 2006/0059689 A1 | 3/2006 | Kagata et al. | |

FOREIGN PATENT DOCUMENTS

| | | | |
|---|---|---|---|
| JP | 58112452 A | * | 7/1983 |
| JP | 62166755 A | * | 7/1987 |
| JP | 64-040254 U | | 3/1989 |
| JP | 01255453 A | * | 10/1989 |
| JP | 02-051714 U | | 4/1990 |
| JP | 4-49665 U | | 4/1992 |
| JP | 06335226 A | * | 12/1994 |
| JP | 2000-037069 A | | 2/2000 |
| JP | 2000091854 U | | 3/2000 |
| JP | 2002-037104 A | | 2/2002 |
| JP | 2003-032955 A | | 1/2003 |
| JP | 2005-012917 A | | 1/2005 |
| JP | 2005-253137 A | | 9/2005 |
| JP | 2005-253138 A | | 9/2005 |
| JP | 2005-261029 A | | 9/2005 |
| JP | 2006005987 A | | 1/2006 |
| JP | 2006-090390 A | | 4/2006 |
| WO | 01/05018 A1 | | 1/2001 |
| WO | 2005124970 A1 | | 12/2005 |

OTHER PUBLICATIONS

Notice of Reason for Rejection, corresponding to JP 2008-525288, mailed Sep. 28, 2010.

* cited by examiner

DIRECT CURRENT MOTOR

TECHNICAL FIELD

The present invention is used for a direct current motor such as a motor for driving an EGR (exhaust gas recirculation) valve apparatus for configuring an exhaust gas recirculation system.

BACKGROUND ART

A conventional direct current motor is configured in such a way that two ball bearings hold a rotor (refer to Patent Document 1, for example).
[Patent document 1]
International Publication Number 2001-05018 (FIG. 2)

DISCLOSURE OF THE INVENTION

In recent years, downsizing of a direct current motor, particularly in the axial direction, is required by automobile manufacturers. Instead of an above-described direct current motor, a direct current motor has been proposed in which a sleeve bearing is used as one of the two bearings holding the rotor and a ball bearing, which has a larger load-bearing capacity than a sleeve bearing, is used as the other bearing so that most of the load of the rotor is held by the ball bearing, which has a larger load-bearing capacity than the sleeve bearing.

In such a direct current motor, because most of the rotor load is held by a single ball bearing, the size of the ball bearing is larger in the radial and axial directions than that of a ball bearing used in the conventional direct current motor. However, the direct current motor employs a sleeve bearing, instead of the ball bearing, as one of the bearings that hold the rotor.

The conventional direct current motor has employed ball bearings instead of sleeve bearings. Therefore, if, for example, a ball bearing and a current-carrying portion were to be arranged in the same plane in order to reduce the entire length in the axial direction, the radial size of the direct current motor would become larger. This leads to size increase of the direct current motor, so that the ball bearing and the current-carrying portion cannot be arranged on the same plane in the conventional direct current motor.

In contrast, in a direct current motor in which a sleeve bearing is used as one of the two bearings, a space is created in the radial direction by employing a sleeve bearing whose radial thickness is smaller than a ball bearing, so that the sleeve bearing and the current-carrying portion can be arranged on the same plane in the axial direction. Therefore, because in the direct current motor in which a sleeve bearing is used as one of the two bearings, the sleeve bearing and the current-carrying portion can be arranged on the same plane in the axial direction, size reduction in the axial direction can be achieved compared with the conventional direct current motor employing two ball bearings.

In addition, in a case in which a sleeve bearing is used as one of the two bearings as in the above-described direct current motor, the axial size of the ball bearing, i.e., the other bearing, becomes large. However, because the rotor is formed of resin, by reducing the amount of resin for the rotor in the axial direction by the amount of increased size of the ball bearing in the axial direction, the axial size of the direct current motor will not become large, even though the axial size of the ball bearing increases.

However, in the above-described direct current motor, in order to prevent the direct current motor from becoming large outwardly in the radial direction due to increase of the radial size of the ball bearing, it is necessary to increase the size of the ball bearing in the inner diameter direction while keeping the size of the outer diameter of the ball bearing equivalent to that of the conventional motor. If the size of the ball bearing is increased inwardly in the radial direction, the radial thickness of the rotor supported by the ball bearing becomes thinner. The rotor is formed of resin, and a rotor portion supported by the ball bearing is hollow. Therefore, a problem has been that when the radial thickness of the rotor becomes thinner, the holding strength and durability of the rotor is deteriorated.

The present invention has been made to address the above-described problems, and is to provide a direct current motor that can be downsized without deteriorating the holding strength and durability of the rotor.

A direct current motor according to the present invention includes: a stator on which a plurality of coils is provided; a rotor including a plurality of magnetic poles that is provided so as to face the inner periphery of the stator, and a metal member on one end of the rotor; a current-carrying portion that is provided on the other end of the rotor and commutates current supplied from a power source to the coils on the stator; a first bearing that holds the rotor; and a second bearing that holds the rotor and bears a load larger than that of the first bearing; wherein the metal member holds the second bearing and is in direct contact with the second bearing.

The present invention enables downsizing of the direct current motor in the axial direction without deteriorating the holding strength and durability of the rotor.

BRIEF DESCRIPTION OF THE DRAWINGS

FIG. 3(A) is a plan view of the stator 2 and a rotor 8, and FIG. 3(B) is a cross-sectional side view of the direct current motor;

FIG. 4(A) is a side view, and FIG. 4(B) is a plan view; FIG. 5(A) is a plan view, and FIG. 5(B) is a cross-sectional view.

Figure 1:
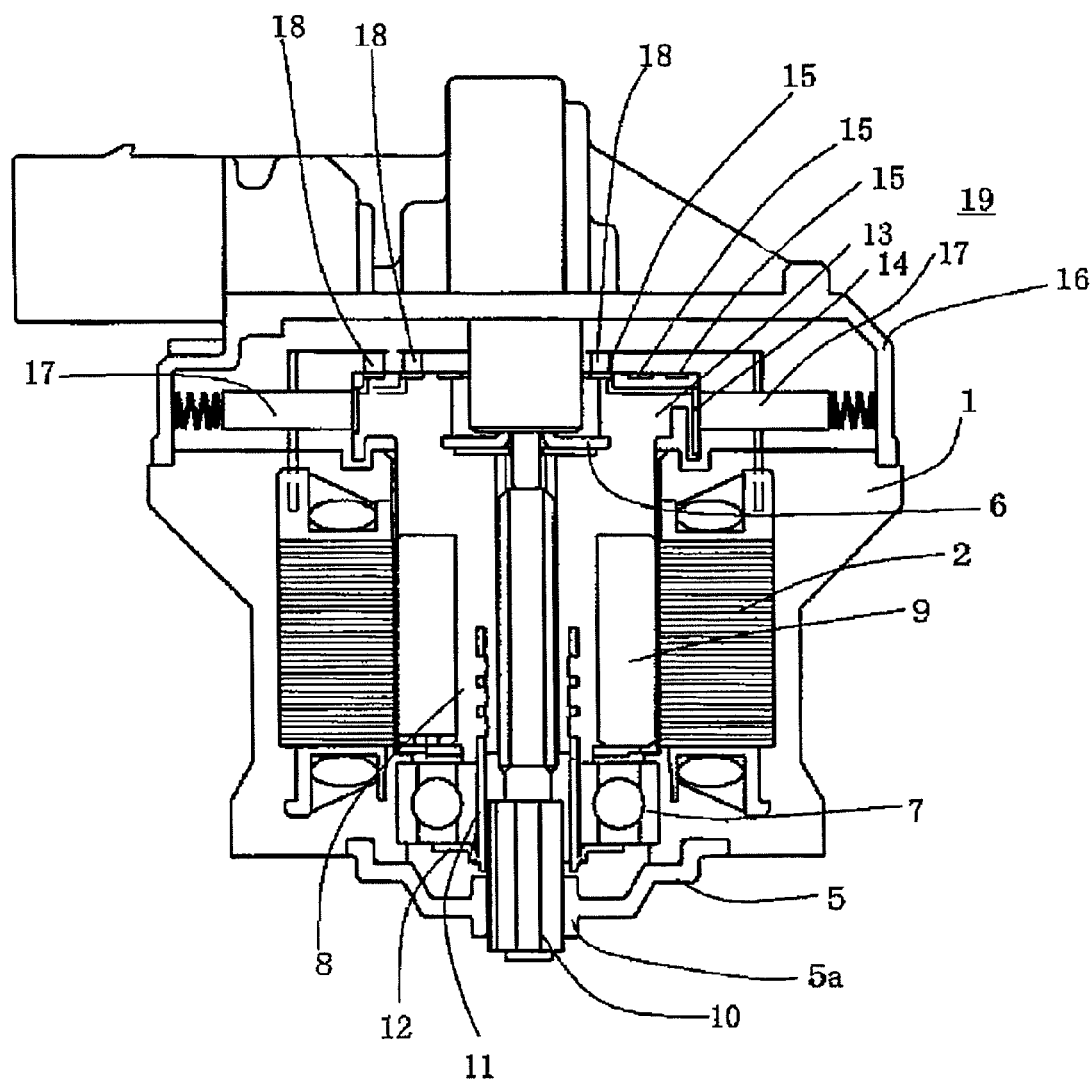
FIG. 1 is a cross-sectional view illustrating a configuration of a direct current motor in Embodiment 1 of the present invention.

DESCRIPTION OF THE SYMBOLS 2. stator
3. stator core
4. coils
6. sleeve bearing
7. ball bearing
8. rotor
9. permanent magnets
11. pipe
12. plate
14. commutators
15. slip rings
19. current-carrying portion
20. bending portion
21. holes
22. tapered portion

BEST MODE FOR CARRYING OUT THE INVENTION

Embodiment 1

Hereinafter, an embodiment of the present invention will be described in reference to drawings.

Figure 2:
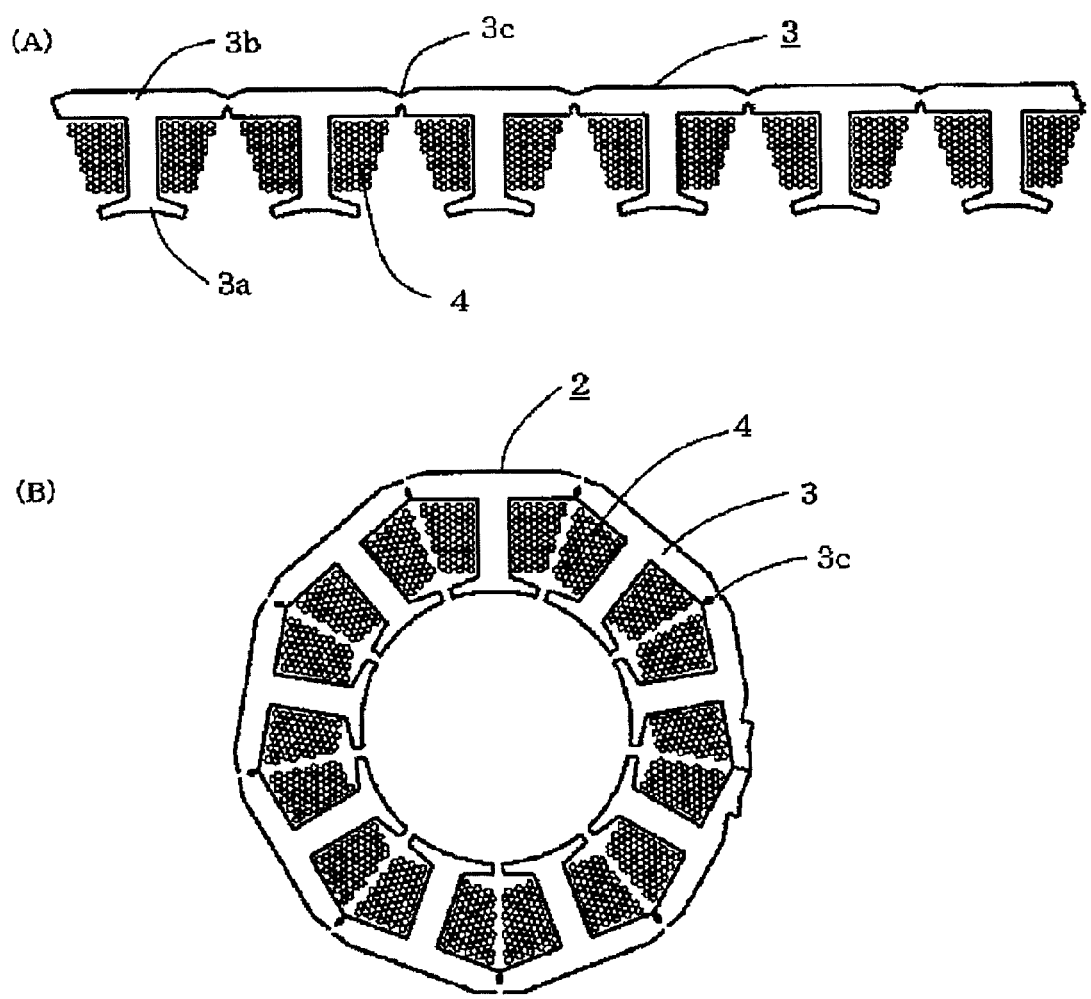
FIG. 2 includes plan views illustrating a method of manufacturing a stator 2 for a direct current motor shown in FIG. 1.

FIG. 1 is a cross-sectional view illustrating a configuration of a direct current motor in Embodiment 1 of the present invention. FIG. 2 is a plan view illustrating a method of manufacturing a stator of the direct current motor shown in FIG. 1.

In FIG. 1, numeral 1 denotes a motor case formed of resin material, and numeral 2 denotes a stator formed through resin molding integrally with the motor case 1. As shown in FIG. 2(A), magnetic pole teeth 3a protrude from respective core pieces 3b, a magnetic material is formed by connecting the core pieces each other through thin portions 3c, and a predetermined number of magnetic materials are laminated to form a stator core 3. In order to facilitate winding coils, after coils 4 are wound around the respective magnetic pole teeth 3a by a coil winding machine (unillustrated) in this state, the stator is formed into a circular shape by bending the thin portions 3c as illustrated in FIG. 2(B).

Numeral 5 denotes a flange member attached to one end portion of the motor case 1, and a boss portion 5a for holding a shaft 10 is formed in the central portion of the flange member, protruding therefrom. Numeral 6 denotes a sleeve bearing as a first bearing, and numeral 7 denotes a ball bearing as a second bearing. The ball bearing 7 has a larger load-bearing capacity than the sleeve bearing 6. Moreover, it can be understood from FIG. 1 that the sleeve bearing 6 is thinner in the radial direction than the ball bearing 7.

Numeral 8 denotes a rotor, whose both ends are held by the sleeve bearing 6 and the ball bearing 7, and on the periphery of which a plurality of permanent magnet magnetic poles 9 is provided at positions corresponding to the magnetic pole teeth 3a of the stator 2. Numeral 10 denotes a shaft that can move translationally in the axial direction in accordance with rotation of the rotor 8. For example, when the direct current motor is used for an EGR valve apparatus, valve members (unillustrated) that open and close openings between an exhaust channel (unillustrated) and an inlet channel (unillustrated) move translationally in the axial direction according to the translational movements of the shaft 10 in the axial direction. The opening and closing of the valve members recirculate part of exhaust gas through the inlet channel or adjust the amount of the exhaust gas to be recirculated.

Numeral 11 denotes a pipe as a metal member that is provided on one end portion of the rotor 8 and holds the ball bearing 7. The pipe 11 is in direct contact with a wall surface of the inner ring of the ball bearing 7. Numeral 12 denotes a plate that supports the inner ring of the ball bearing 7 in the axial direction. The pipe 11 and the plate 12 are fixed by welding or the like. The outer ring of the ball bearing 7 is axially restrained by the motor case 1.

Numeral 13 denotes a circular plate that is firmly fixed to the other end portion of the rotor 8 or integrally formed therewith, and rotates with the rotor 8. Numeral 14 denotes commutators circumferentially formed in plural segments around the circular plate 13. The contact surfaces of the commutators 14 are formed to face the radial direction. Numeral 15 denotes slip rings that are formed in n separate concentric rings (three rings are shown in the figure) in the inner side of the commutators 14. The contact surfaces of the slip rings 15 are formed to face the axial direction. Numeral 16 denotes a bracket to be attached to the other end portion of the motor case 1.

Numeral 17 denotes a pair of first brushes that are insulatedly supported by the bracket 16, and are pressed by a predetermined force by elastic bodies such as coil springs so that leading ends of the first brushes are in sidable contact with the contact surfaces of the commutators 14. The first brushes 17 are brought into radial contact with the commutators 14. Numeral 18 denotes three second brushes that are insulatedly supported by the bracket 16, and are pressed by a predetermined force by elastic bodies such as springy members so that leading ends of the second brushes are in sidable contact with the contact surfaces of the slip rings 15. The second brushes 18 are brought into axial contact with the respective slip rings 15.

A current-carrying portion 19 is configured with the components indicated by numerals 13 through 15.

Next, operations of the direct current motor according to Embodiment 1 configured as above will be described.

Figure 3:
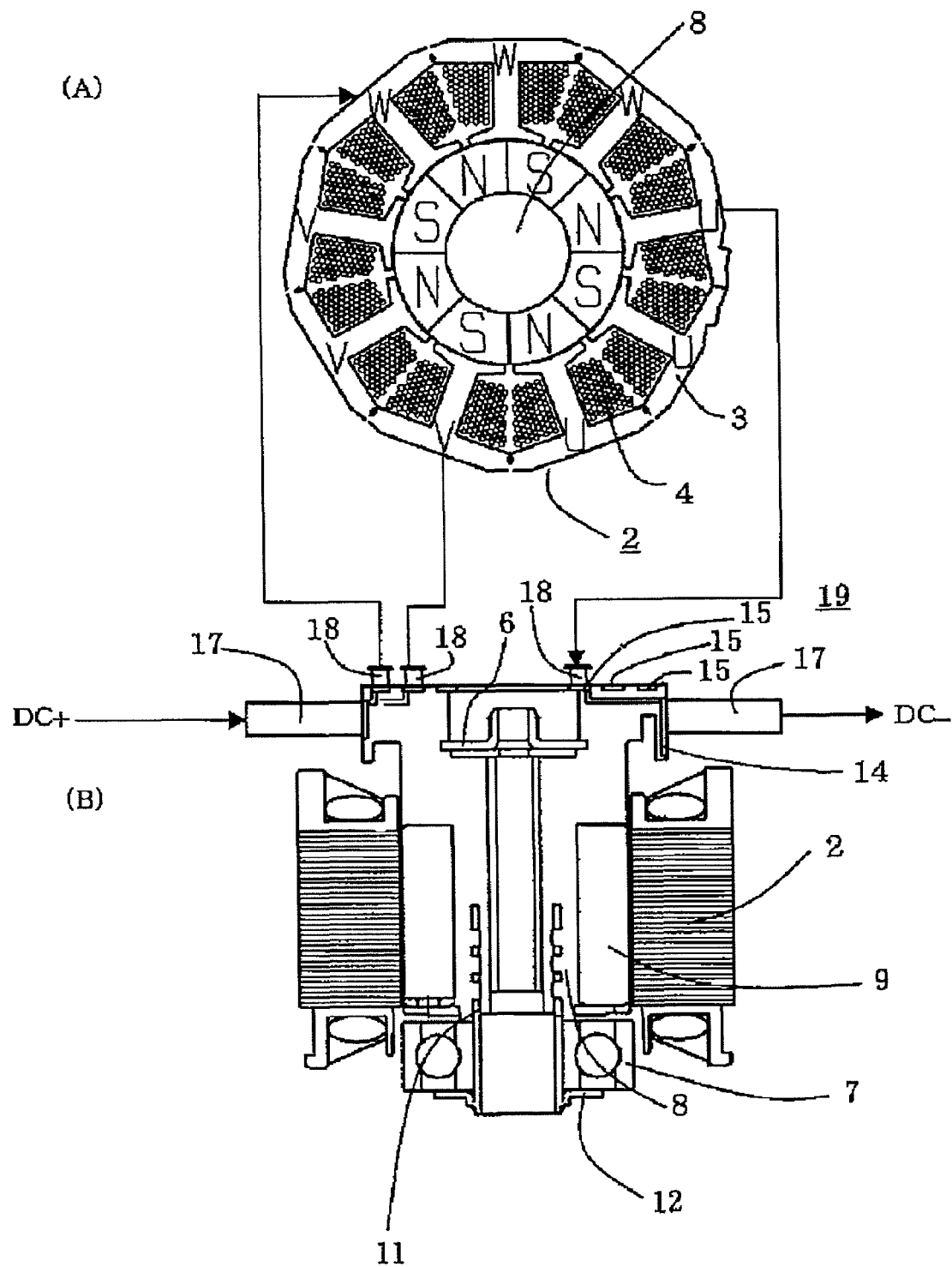
FIG. 3 illustrates a flow of current through a current-carrying portion 19 in the direct current motor shown in FIG. 1, where

FIG. 3 illustrates a flow of current through the current-carrying portion 19 in the direct current motor shown in FIG. 1. FIG. 3(A) is a plan view of the stator 2 and the rotor 8, and FIG. 3(B) is a cross-sectional side view of the direct current motor.

Firstly, when direct current (DC+) flows in through one of the first brushes 17 from the power source (unillustrated), as illustrated in FIGS. 3(A) and 3(B), the current is commutated by one of the commutators 14 and flows through a corresponding slip ring 15, and is supplied to the stator 2 through a second brush 18 and flows through the coils 4. After that, the current flows through another second brush 18, another slip ring 15, and another commutator 14, and flows out to the power source (DC−) via the other first brush 17.

Then torque is generated in the rotor 8 by interaction between magnetic flux generated in the coils 4 through which the current flows and the permanent magnet magnetic poles 9 on the rotor 8. Because the circular plate 13 also rotates due to the torque, combination of the first brush 17 and a commutator 14 in contact with the brush is changed, and the coils 4 through which the current flows are successively switched, whereby the rotor 8 starts continuous rotation. The shaft 10 translationally moves in the axial direction as the rotor 8 rotates.

For example, when the direct current motor is used for an EGR valve apparatus, the valve members (unillustrated) that open and close openings between the exhaust channel (unillustrated) and the inlet channel (unillustrated) move translationally in the axial direction according to the translational movements of the shaft 10 in the axial direction. The opening and closing of the valve members recirculate part of exhaust gas through the inlet channel or adjust the amount of the exhaust gas to be recirculated.

According to the direct current motor configured as above, the configuration is such that the sleeve bearing 6 and the ball bearing 7 hold the rotor 8, and the pipe 11 for holding the ball bearing 7 is in direct contact with the ball bearing 7. In a case of the conventional direct current motor, in order to achieve axial downsizing, when the sleeve bearing 6 and the ball bearing 7 hold the rotor 8, it is necessary to form the rotor 8 thinner in radial thickness, so that the holding strength and durability of the rotor 8 is deteriorated, which has been a problem. However, regarding the direct current motor illustrated in FIG. 1, the ball bearing 7 is in direct contact with the pipe 11, which is formed of a metal member having higher strength than resin, whereby the axial size of the direct current motor can be reduced without deteriorating the holding strength and durability of the rotor 8.

In addition, the direct current motor uses the pipe 11 as a metal member. By using the pipe 11 as a metal member, because the pipe 11 is hollow in shape, it is not necessary to ensure space for inserting the shaft 10 by post processing, so that workability is enhanced.

Although it has been described in Embodiment 1 that the pipe 11 being a metal member and the plate 12 for retaining the ball bearing 7 in the axial direction are fixed together by welding or the like, it is further beneficial if the pipe 11 and the plate 12 are fixed together particularly by laser welding.

Generally, as a welding method, TIG (Tungsten Inert gas) welding is used, in which welding equipment is inexpensive and welding is easily performed. The TIG welding is a method of welding in which a heat-resistant tungsten electrode (T) is used and inert gas (I) flows therearound.

However, in the TIG welding, because grounding is necessary, a certain amount of space is required in welding, so that the TIG welding is unsuitable for a small product such as a direct current motor according to the present invention Regarding the direct current motor according to the present invention, laser welding is used when welding is performed. The laser welding is a method of putting together metals by generally irradiating metals with a laser beam as a heat source being focused thereon to locally melt and solidify the metals. The laser welding does not require grounding unlike the TIG welding and can be performed in a small space, so that the laser welding is most suitable when the direct current motor according to the present invention is used for a product such as an EGR valve apparatus for which downsizing is required.

Although in Embodiment 1, the shape of the plate 12 is not described in detail, it is further beneficial for the shape of the plate 12 if the plate 12 has a bending portion and is radially extended to cover the ball bearing 7.

Figure 4:
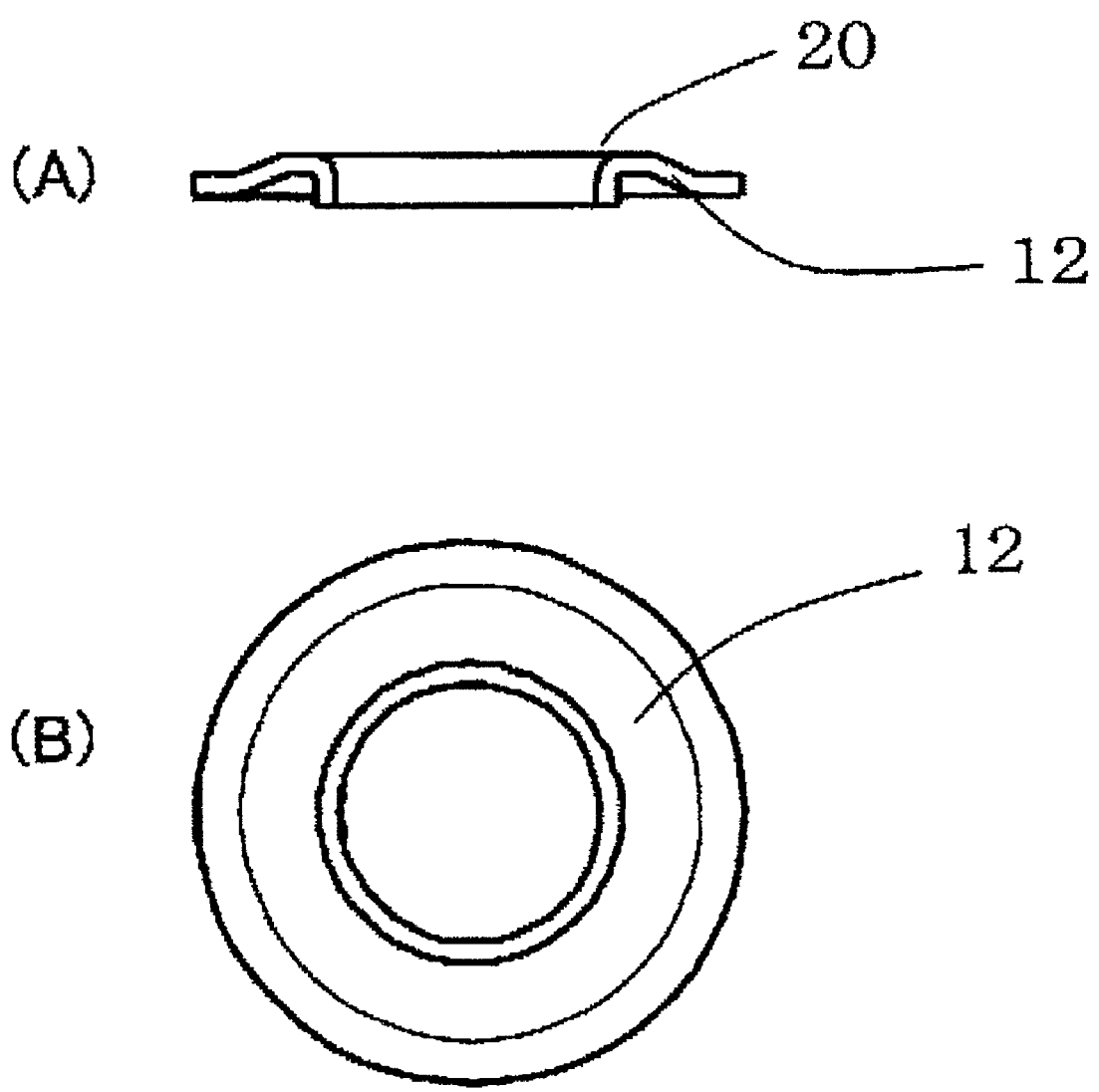
FIG. 4 includes views illustrating a shape of a plate 12 in the direct current motor illustrated in FIG. 1, where

FIG. 4 includes views illustrating the shape of the plate 12 in the direct current motor illustrated in FIG. 1. FIG. 4(A) is a side view, and FIG. 4(B) is a plan view.

The plate 12 of the direct current motor according to the present invention is configured to have the bending portion 20 as illustrated in FIG. 4.

Because the pipe 11 and the plate 12 are joined by the laser welding, heat is generated in the laser welding, and as a result, the heat deforms the plate 12. If the plate 12 is deformed, a gap arises between the plate 12 and the ball bearing 7, so that the plate 12 and the ball bearing 7 wobble. Therefore, control responsiveness of the direct current motor becomes worse.

In the direct current motor according to the present invention, the plate 12 is configured to have the bending portion 20 as described above. It is generally known about ease of thermal deformation that, when a flat plate is compared with the plate 12 having the bending portion 20, the plate 12 having the bending portion 20 is less easily thermally deformed than the flat plate. By providing the bending portion 20, the plate 12 of the direct current motor according to the present invention is formed so as not to be easily thermally deformed compared with the flat plate. Therefore, a problem that a gap arises between the plate 12 and the ball bearing 7 due to thermal deformation of the plate 12 is resolved, so that the plate 12 and the ball bearing 7 are prevented from wobbling, and the direct current motor can be well controlled.

Moreover, it is further beneficial if the plate 12 is configured to cover the ball bearing 7. With such configuration, when the pipe 11 and the plate 12 are laser-welded, flying spatters do not adhere to the ball bearing 7, but to the plate 12. Thus, the spatters are prevented from adhering to the ball bearing 7, and therefore damage and degradation in sidability of the ball bearing 7 due to spatter adherence can be prevented.

In Embodiment 1, the pipe 11 is not described in detail. However, it is further beneficial to use insert molding for the pipe 11 and the rotor 8.

By insert-molding the pipe 11 and the rotor 8, concentricity between the pipe 11 and the rotor 8 can be enhanced. Therefore, the rotor 8 is prevented from wobbling due to misalignment of the axes of the pipe 11 and the rotor 8, so that the direct current motor can be well controlled.

In addition, when the pipe 11 and the rotor 8 are integrally-molded with resin, it is beneficial to provide a portion of the pipe 11 to be insert-molded with holes.

Figure 5:
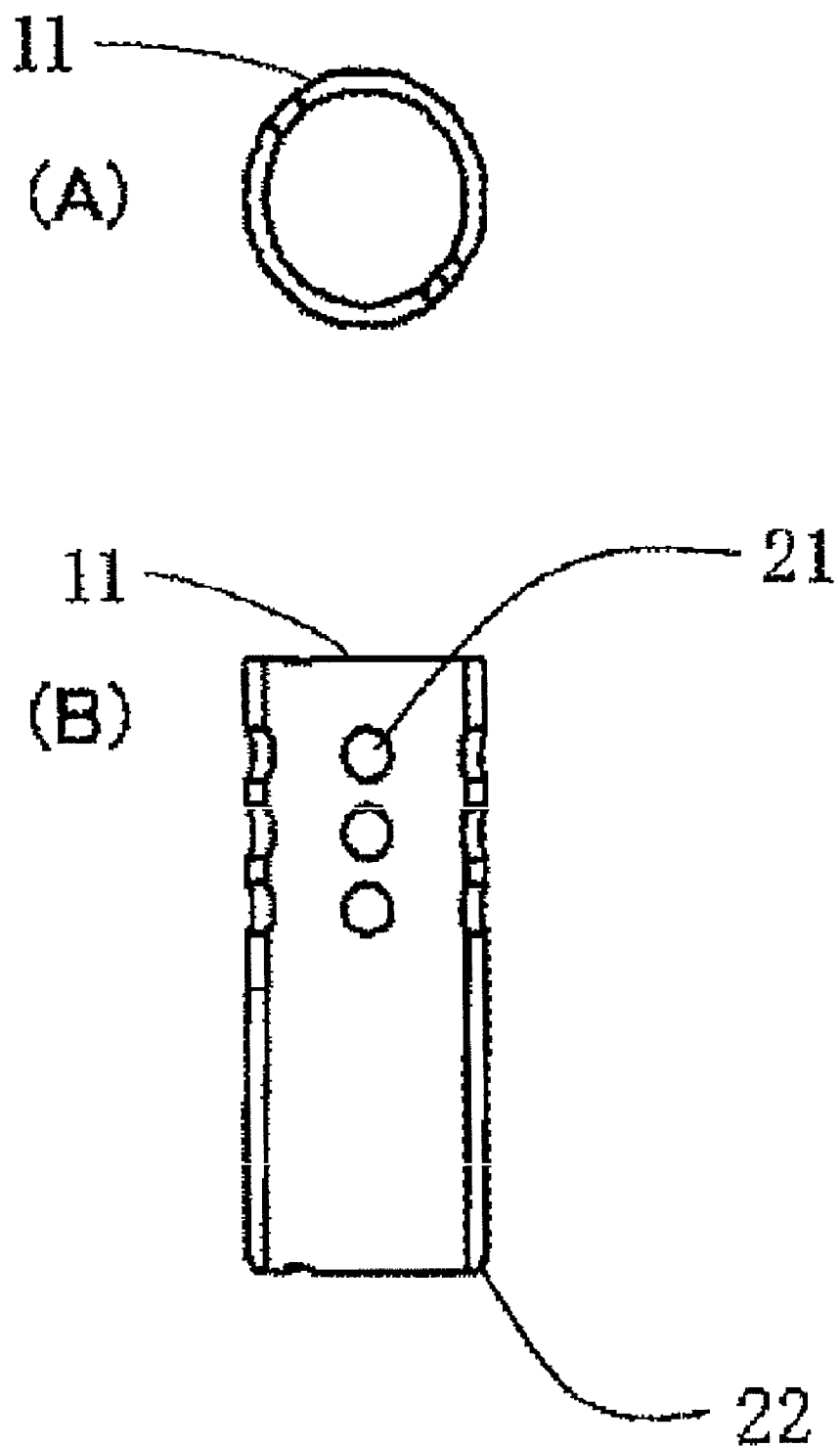
FIG. 5 includes views illustrating a shape of a pipe 11 in the direct current motor shown in FIG. 1, where

FIG. 5 includes views illustrating the shape of the pipe 11 in the direct current motor shown in FIG. 1. FIG. 5(A) is a plan view, and FIG. 5(B) is a cross-sectional view.

Numeral 21 denotes holes created in the pipe 11. In the direct current motor according to the present invention, by creating holes 21 in the pipe 11, when the pipe 11 and the rotor 8 are integrally molded with resin, the holes 21 are filled with the resin. Therefore, holding strength of the pipe 11 in the axial direction is enhanced.

It is further beneficial if the size and the number of the holes 21 are determined so that shear strength of the resin, which is large enough against a reaction force generated in the rotor 8 in axial movement of the shaft 10 in accordance with rotation of the rotor 8, can be obtained.

The pipe 11 can be formed by rolling a plate material.

When the pipe 11 is provided with the holes 21 for improving the holding strength in the axial direction, the holes 21 can be more easily provided by producing the pipe 11 by rolling the plate material after creating the holes 21 in advance than by creating the holes 21 in a pipe material. Such procedure can achieve cost reduction.

In addition, it is beneficial that the end face of the pipe 11 has a tapered portion 22.

The tapered portion 22 is provided at the end face of the pipe 11 illustrated in FIG. 5(B).

Providing the end face of the pipe 11 with the tapered portion 22 enables easy press-fit of the ball bearing 7, the plate 12, and the like, when assembling the direct current motor, so that assembly efficiency of the direct current motor is enhanced.

What is claimed is:

1. A direct current motor comprising:
   a stator on which a plurality of coils is provided;
   a rotor including a plurality of magnetic poles that is provided so as to face an inner periphery of the stator;
   a current-carrying portion that is provided on one end portion of the rotor and commutates current supplied from a power source to the coils on the stator;
   a ball bearing that holds the rotor, the rotor pressing an upper face of an inner ring of the ball bearing;
   a bearing that holds the rotor and has a smaller load-bearing capacity than that of the ball bearing;
   a shaft that translationally moves in the axial direction of the rotor in accordance with rotation of the rotor; and
   a pressing member that is fixed to the other end portion of the rotor and presses a lower face of the inner ring of the ball bearing,
   wherein:
   the pressing member comprises a pipe that is attached to an inner side of the inner ring of the ball bearing, and a plate presses the inner ring of the ball bearing.

2. The direct current motor according to claim 1, wherein the pipe and the plate are fixed by laser welding.

3. The direct current motor according to claim 2, wherein the plate comprises a bending portion and covers the ball bearing.

4. The direct current motor according to claim 3, wherein the pipe and the rotor are insert-molded.

5. The direct current motor according to claim 4, wherein the pipe is provided with at least one hole.

6. The direct current motor according to claim 5, wherein the pipe is formed by rolling a plate material.

7. The direct current motor according to claim 1, wherein a lower end portion of the pipe is tapered.

8. The direct current motor according to claim 7, wherein the pipe is formed by rolling a plate material.

9. The direct current motor according to claim 1, wherein at least a portion of the bearing having a smaller load-bearing capacity is housed in an opening provided in the current-carrying portion.

10. The direct current motor according to claim 1, wherein the pipe is formed of metal.

* * * * *